United States Patent

Paap et al.

[11] 4,032,780
[45] June 28, 1977

[54] BEHIND CASING WATER FLOW DETECTION USING CONTINUOUS OXYGEN ACTIVATION

[75] Inventors: Hans J. Paap; Dan M. Arnold; Harold E. Peelman, all of Houston, Tex.

[73] Assignee: Texaco Inc., New York, N.Y.

[22] Filed: Nov. 3, 1975

[21] Appl. No.: 628,174

[52] U.S. Cl. .............................. 250/266; 250/265; 250/270

[51] Int. Cl. ............................................ G01v 5/00

[58] Field of Search .......... 250/264, 270, 356, 265, 250/266

[56] References Cited

UNITED STATES PATENTS

| | | | |
|---|---|---|---|
| 3,239,663 | 3/1966 | Oshry et al. | 250/356 |
| 3,603,795 | 9/1971 | Allaud | 250/264 |

Primary Examiner—Davis L. Willis
Attorney, Agent, or Firm—Carl G. Ries; Thomas H. Whaley; William J. Beard

[57] ABSTRACT

Measurement of the volume flow rate and linear flow velocity of undesired behind casing water flow is provided. A well tool having a 14 MEV neutron source is used to continuously irradiate earth formations behind well casing. The continuous neutron irradiation activates elemental oxygen nuclei comprising the molecular structure of any undesired water flow to be detected. Dual spaced gamma ray detectors located above or below the neutron source detect the decay of unstable isotope nitrogen 16 and from these indications the linear flow velocity of the undesired water flow is deduced. By then estimating the distance R to the undesired flow region the volume flow rate V may be deduced.

16 Claims, 17 Drawing Figures

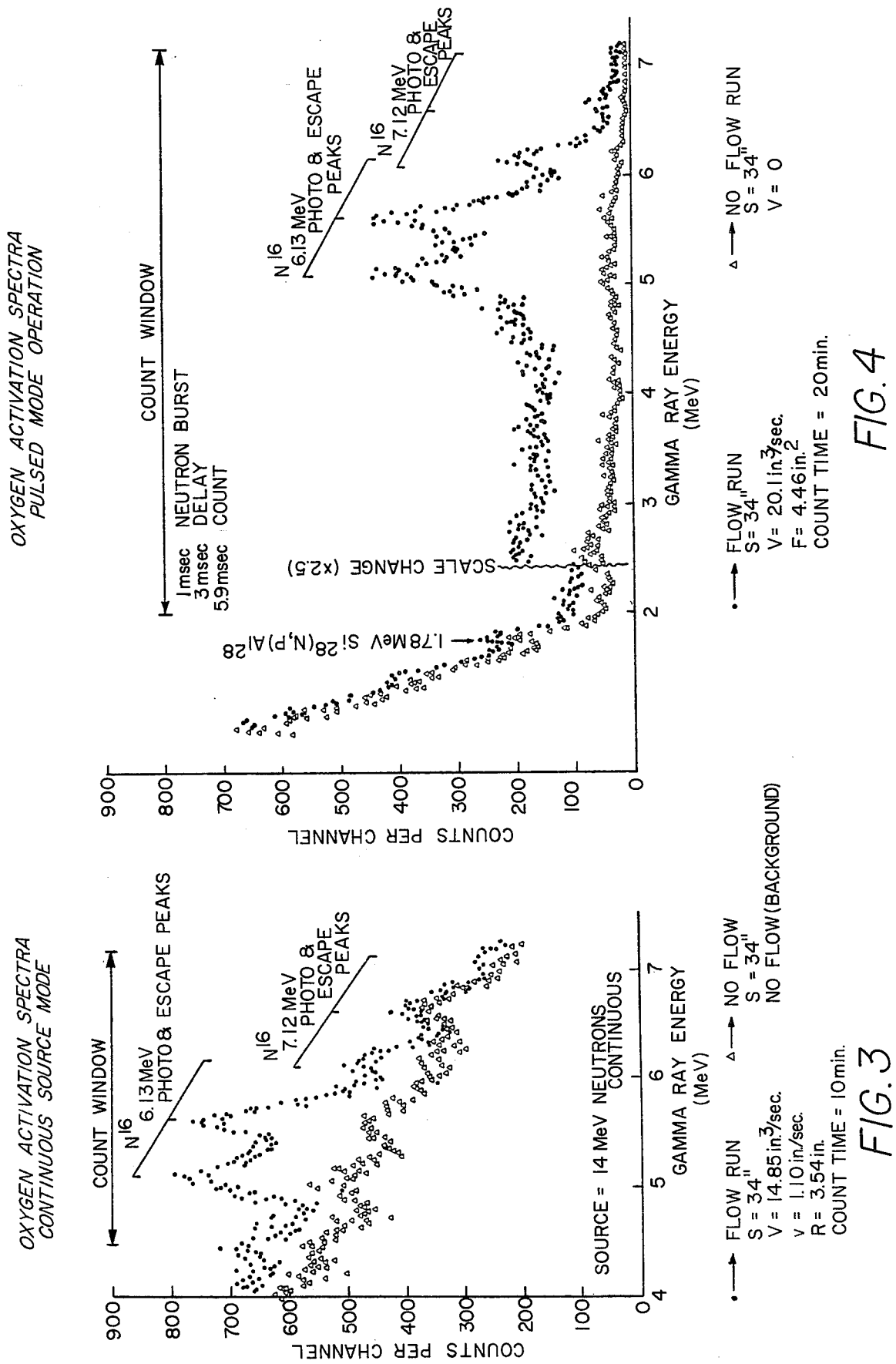

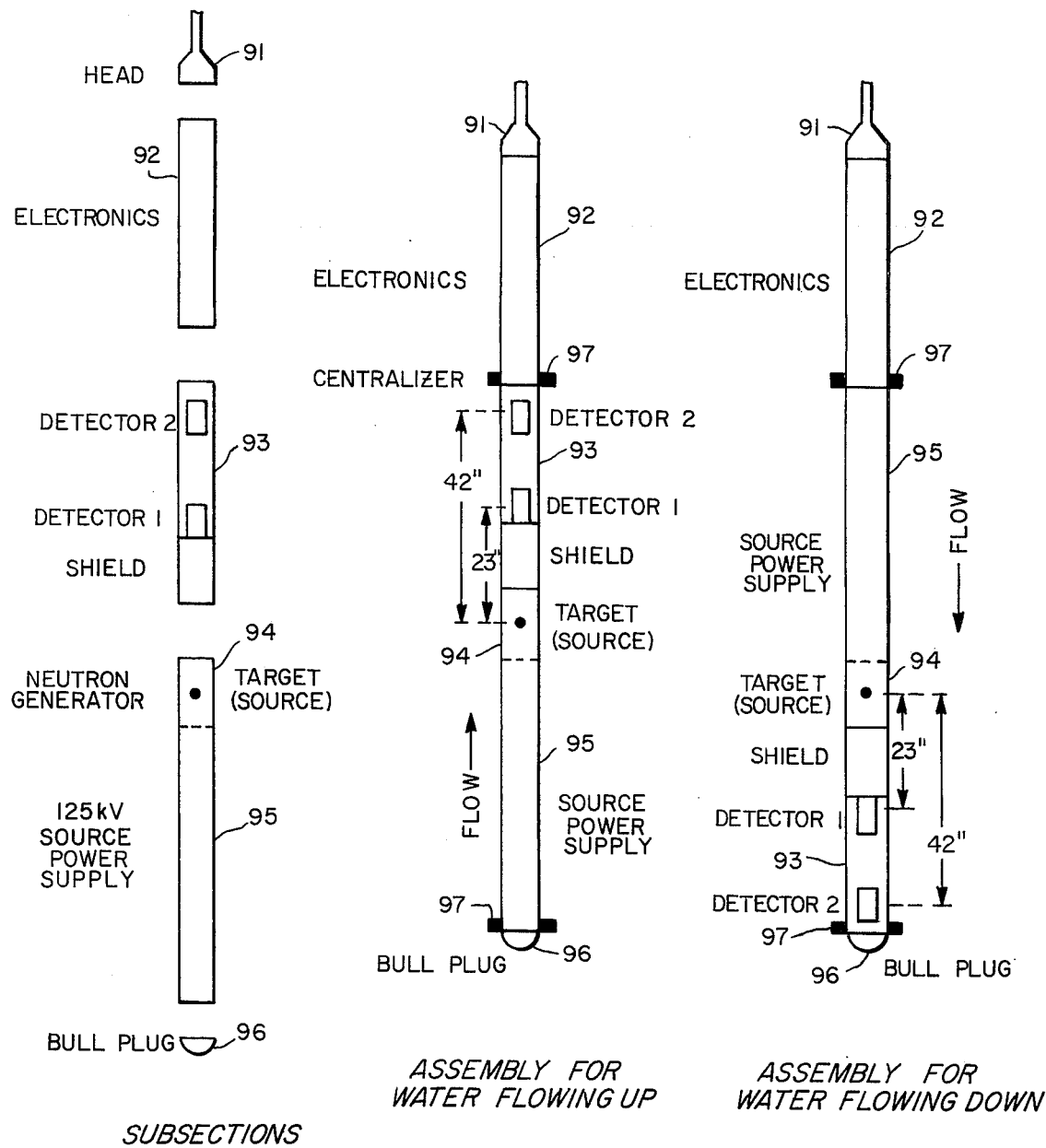

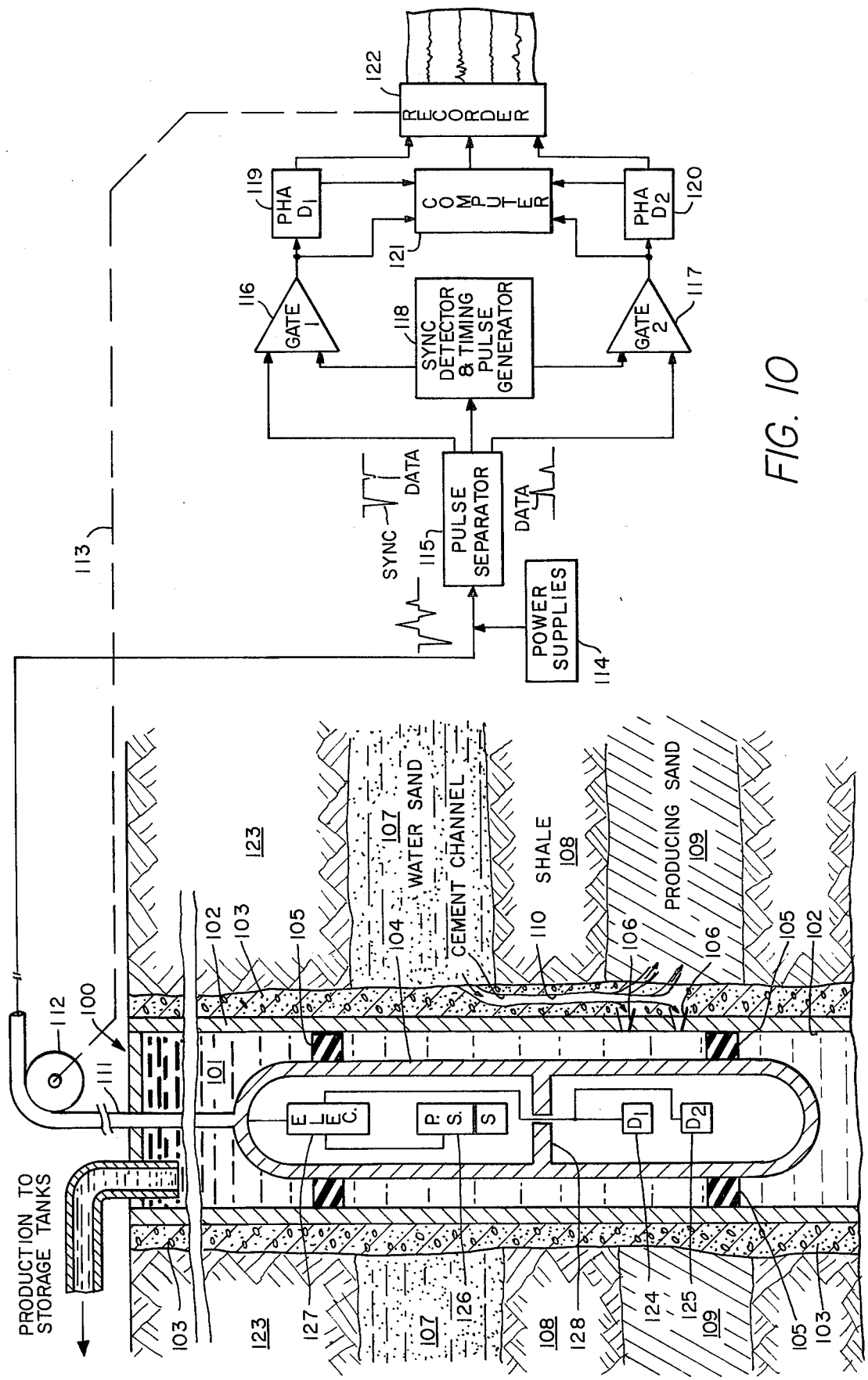

BEHIND CASING WATER FLOW DETECTION USING CONTINUOUS OXYGEN ACTIVATION

BACKGROUND OF THE INVENTION

This invention relates to well logging methods and apparatus and more particularly to nuclear well logging techniques to determine the presence of undesired water flow in cement voids or channels behind steel well casing in a cased well borehole.

Undesired fluid communication along the cased in portion of a well between producing zones has long been a problem in the petroleum industry. The communication of fresh or salt water from a nearby water sand into a petroleum production sand can contaminate the petroleum being produced by the well to an extent that production of petroleum from the well can become commercially unfeasible due to the "water cut". Similarly, in near surface water wells used for production of fresh water for city or town drinking supplies or the like, the contamination of the fresh water drinking supply by the migration of salt water from nearby sands can also contaminate the drinking water supply to the extent where it is unfit for human consumption without elaborate contaminant removal processing.

In both of these instances, it has been found through experience over the course of years that the contamination of fresh water drinking supplies or producing petroleum sands can occur many times due to the undesired communication of water from nearby sands down the annulus between the steel casing used to support the walls of the borehole and the borehole wall itself. Usually steel casing which is used for this purpose is cemented in place. If a good primary cement job is obtained on well completion, there is no problem with fluid communication between producing zones. However, in some areas of the world where very loosely consolidated, highly permeable sands are typical in production of petroleum, the sands may later collapse in the vicinity of the borehole even if a good primary cement job is obtained. This can allow the migration of water along the outside of the cement sheath from a nearby water sand into the producing zone. Also, the problem of undesired fluid communication occurs when the primary cement job itself deteriorates due to the flow of fluids in its vicinity. Similarly, an otherwise good primary cement job may contain longitudinal channels or void spaces along its length which permit undesired fluid communication between nearby water sands and the producing zone.

Another problem which can lead to undesired fluid communication along the borehole between producing oil zones and nearby water sands is that of the so called "microannulus" between the casing and the cement. This phenomenon occurs because when the cement is being forced from the bottom of the casing string up into the annulus between the casing and the formations, (or through casing perforations), the casing is usually submitted to a high hydrostatic pressure differential in order to force the cement into the annulus. The high pressure differential can cause casing expansion. When this pressure is subsequently relieved for producing from the well, the previously expanded casing may contract away from the cement sheath formed about it in the annulus between the casing and the formations. This contraction can leave a void space between the casing and the cement sheath which is sometimes referred to as a microannulus. In some instances, if enough casing expansion has taken place during the process of primary cementing (such as in a deep well where a high hydrostatic pressure is required) the casing may contract away from the cement sheath leaving a microannulus sufficiently wide for fluid to communicate from nearby water sands along the microannulus into the producing perforations and thereby produce an undesirable water cut.

There have been many attempts in the prior art to evaluate and locate the existence of cement channels. There have also been many attempts in the prior art to locate and confirm the existence of so called microannulus fluid communication problems. Perhaps primary among these attempts in the prior art has been that of the use of the acoustic cement bond log. In this type of logging operation, the amplitude of acoustic wave energy which is propogated along the casing from an acoustic transmitter to one or more acoustic receivers is examined. In principle, if the casing is firmly bonded to the cement and to the formations, the acoustic energy propogated along the casing should radiate outwardly from the casing into the cement and surrounding formations, thereby reducing the amplitude of the casing signal. However, if the casing is poorly bonded to the cement or if the cement is poorly bonded to the formations, a void space exists and the acoustic energy should remain in the casing and arrive at the acoustic energy receivers at a much higher amplitude than if a good cement bond existed between the casing, the cement and the formations.

Acoustic cement bond logging, however, cannot always reliably detect the existence of a microannulus which can in some instances permit undesirable fluid communication between water sands and nearby producing zones. If the microannulus is sufficiently small and fluid filled, the acoustic energy propagated along the casing may be coupled across it. Yet it has been found that even such a small microannulus can permit undesirable fluid communication between producing zones. Similarly, a poor quality cement job may go undetected by the use of the acoustic cement bond log if the cement sheath is permeated by a variety of channels or void spaces which are located unsymmetrically about its circumference. Such channels or void spaces can permit undesirable fluid flow while the main body of cement is bonded well to the casing and the formations thus propagating the acoustic energy satisfactorily from the casing outwardly through the cement and into the formations. Therefore, such means as acoustic cement bond well logging have been proven to be not entirely reliable for the detection of potential undesired fluid communication paths in a completed well.

Another approach to locating void spaces or channels in the cement sheath in the prior art has been to inject radioactive tracer substances such as Iodine 131 or the like through producing perforations into the producing formations and into any void spaces in the annulus surrounding the well casing. The theory in this type of operation is that if the tracer material can be forced backward along the flow path of the undesired fluid its radioactive properties may then be subsequently detected behind the casing by radiation detectors. This type of well logging operation has usually proven to be unsatisfactory however, particularly in loosely consolidated sand formations which is precisely where undesired fluid communication is most typically encountered.

In particularly permeable formations such as loosely consolidated sands, the producing formation itself can absorb most of the radioactive tracer material which is forced through the perforations. Very little, if any, of the tracer material can be forced back along the path of undesired fluid flow, particularly, if this involves forcing the flow of tracer against either formation fluid pressure or upward against the force of gravity. Therefore, such tracer logging techniques for detecting cement channels or voids behind the casing have usually proven ineffective in the prior art.

BRIEF DESCRIPTION OF THE INVENTION

The prior art attempts may thus be characterized generally as attempts to evaluate the cement sheath. The present invention relates to methods and apparatus for detecting the undesired flow of water itself in cement channels or voids behind the casing in a producing well. The nuclear well logging techniques used in the present invention involve the activation by high energy neutrons of elemental oxygen nuclei comprising a portion of the undesirable water flow itself. A source of high energy neutrons is placed inside the well borehole opposite the area to be investigated for cement channeling or undesired fluid communication along the sheath. A source of approximately 14 MEV monoenergetic neutrons is used to irradiate the area with such neutrons. An oxygen 16 nucleus upon the capture of an approximately 10 MEV neutron is transmuted to radioactive nitrogen 16. The radioactive nitrogen 16 decays with a half life of about 7.1 seconds by the emission of a beta particle and high energy gamma rays having energies of approximately 6 MEV or more. With a sufficiently high flux of 10 MEV neutrons irradiating the undesired water flowing in a cement void, or microannulus channel, enough radioactive nitrogen 16 is created in the undesired water flow itself to be detectable at a pair of longitudinally spaced detectors. This measurement can be used directly to indicate the speed of flow of the water in the cement channels. Moreover, novel techniques are developed in the invention for determining the volume flow rate of water in such cement channels, microannulus or void spaces from the degradation of the high energy gamma ray spectrum by Compton scattering of gamma rays produced by the decay of the radioactive nitrogen 16. The approximate distance from a single gamma ray detector to the mean center of the water flow path may be thus determined. Yet another feature of the invention is that by the use of a pulsed, rather than continuous, neutron source for the measurements described, a more accurate flow detection is provided by reducing the background gamma radiation caused by relatively prompt thermal or epithermal neutron interactions in the vicinity of the borehole.

Moreover, by first placing a longitudinally spaced high energy gamma ray detector pair above and then by placing the detector pair below the neutron source, fluid flow occurring within and without the casing may be distinguished with the use of only relatively valid assumptions. In yet another feature of the invention, the detection of undesired fluid flow in a producing zone under producing conditions is enabled by the use of small diameter water flow detection apparatus sized to pass through production tubing and utilizing the same flow detection principles previously discussed. Also, a technique is developed in the invention for distinguishing undesired behind casing fluid flow in the same direction as desired fluid flow in an adjacent production tubing string passing through a producing zone which is being investigated for cement channeling in a multiple completion well. In this instance, the flow of water both inside the production tubing string passing through the zone being investigated and the undesired flow of water in cement channels or voids exterior to the casing can be in the same direction and yet still be distinguishable. In other techiques utilizing the novel concepts of the invention, operations are provided for distinguishing water flow within and without the casing on the basis of its direction of flow in the logging operation.

Finally, additional novel techniques are disclosed herein for constructing a production profile across the perforated casing zone in a producing formation to indicate from which casing perforations any undesirable water cut is being produced. In this instance, the instrumentation and methods of the present invention are used to determine quantitatively the flow rates of undesired produced water inside the casing.

The above objects, features and advantages of the present invention are pointed out with particularity in the appended claims. The invention may best be understood, however, by reference to the following detailed description thereof when taken in conjunction with the accompanying drawings.

BRIEF DESCRIPTION OF THE DRAWINGS

FIG. 3 is a graphical representation of the response of a continuous neutron source water flow detection system under flow and no flow conditions.

FIG. 4 is a graphical representation of the response of a pulsed neutron source water flow detection system under flow and no flow conditions.

FIG. 9 is a schematic representation of the downhole portion of a modular water flow detection sonde according to the invention.

FIG. 10 is a schematic representation of a water flow detection system in a cased well bore according to the invention.

DETAILED DESCRIPTION OF THE INVENTION

Before considering a detailed description of hardware systems employed to measure the flow rate of water behind the casing according to the concepts of the present invention, it will be helpful to consider the theoretical basis for the measurement according to the principles of the invention.

The techniques of the present invention are predicated upon the creation of the unstable radioactive isotope nitrogen 16 in the stream of water flowing behind the casing which is to be detected. This is accomplished by bombarding the flowing water with high energy neutrons having an energy in excess of approximately 10 MEV. This bombardment can cause the creation by nuclear interaction of the unstable nitrogen isotope 16 from the oxygen nuclei comprising the water molecules in the flow stream, the nuclear reaction being $O^{16}$ (n,p) $N^{16}$.

Figure 1:
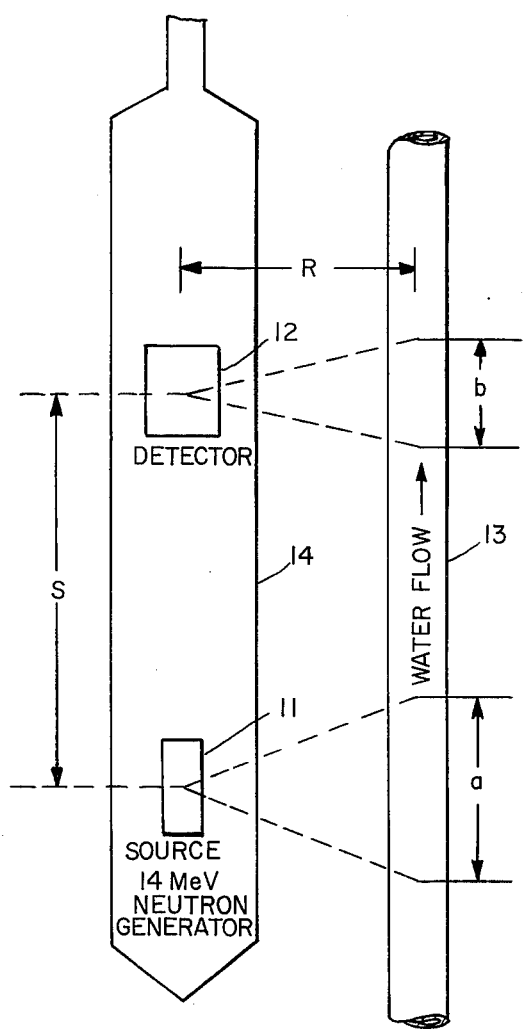
FIG. 1 illustrates schematically the geometry of a single detector water flow sonde.

Referring initially to FIG. 1, consider a hypothetical downhole fluid tight sonde 14 housing a 14 MEV neutron generator 11 and a gamma ray detector 12. The center of the gamma ray detector 12 is spaced S inches from the center of the neutron source 11. Also, consider a channel of water 13 which flows parallel to the axis of sonde 14 and whose center is R inches from the center of the sonde 14 and which is flowing from the neutron source 11 toward the detector 12. It may be shown that C, the counting rate resulting from the decay of the induced radioactive nitrogen 16 activity which is recorded by the detector 12 is given by equation 1.

$$C = \Sigma_o \phi_n G\, K(R)\, V(e^{\lambda\, a/2v} - e^{-\lambda\, a/2v})(e^{\lambda\, b/2v} - e^{-\lambda\, b/2v})e^{-\lambda\, S/v} \quad (1)$$

where
$V$ = the volume flow of water (in$^3$/sec)
$\lambda = 0.0936\ \text{sec}^{-1}$ = the decay constant of $N^{16}$
$a$ = the effective irradiation length of the water stream as it passes the source (inches)
$b$ = the effective detection length of the water stream as it passes the detector (inches)
$v$ = the linear velocity of the water stream (in/sec)
$\phi_n$ = the neutron output of the source (neutrons/cm/sec)
$G$ = A geometric and efficiency factor of the detector
$K(R)$ = a function dependent upon the distance R (inches) from the center of the sonde to the center of the water flow
$S$ = the source-detector spacing (inches)
$\Sigma_o$ = (a constant) = $N_o\, P\Sigma a/M\lambda b$ where $N_o$ is Avogodro's number, M is the molecular weight of water, $\rho$ is the density of water and $\Sigma$ is the microscopic cross section of oxygen for neutron capture.

Equation 1 may be rewritten as follows:

$$C/V = fK(R)(e^{\lambda\, a/2v} - e^{-\lambda\, a/2v})(e^{\lambda\, b/2v} - e^{-\lambda\, b/2v})e^{-\lambda\, S/v} \quad (2)$$

where
$f = \Sigma_o\, \phi_n\, G$

The quantities S, $a$ and $b$ are characteristics of the water flow sonde 14 and are measurable or calibratable quantities. $\Sigma o$ is characteristic of the physical properties of water, the water flow sonde, and the $O^{16}(n,p)N^{16}$ reaction and can also be measured. If the source and detector geometries are held fixed and the neutron output is held constant, equation 2 then indicates that for a given value of R, C/V is a function of $v$ the linear flow velocity of the water and is not a function of the geometry (i.e., the annulus size, cement channel, etc.) of the water flow.

Figure 2:
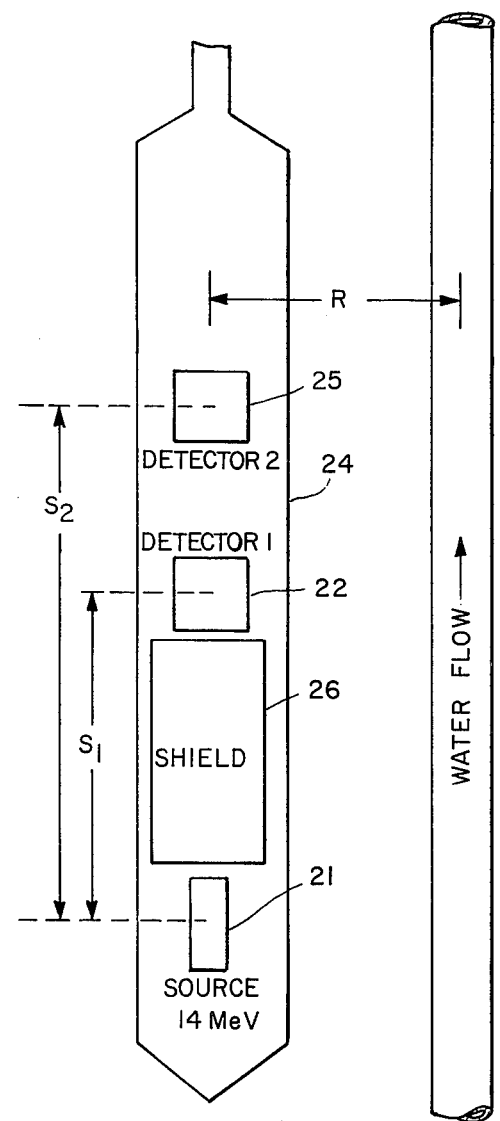
FIG. 2 illustrates schematically the geometry of a dual detector water flow sonde.

Referring now to FIG. 2, consider a second dual detector hypothetical logging sonde 24 which contains a 14 MEV neutron generator 21 and two gamma ray detectors 22 and 25, spaced S1 and S2 inches from the center of the neutron source 21. Shielding material 26 is placed between the source and detector here. Referring to equation 2, the ratio of counting rates recorded in detectors 22 and 25 may be expressed as:

$$C_1/C_2 = e^{+\lambda\, (S_2 - S_1)/v} \quad (3)$$

Solving equation 3 for $v$, the linear flow velocity, it may be seen that:

$$v = \lambda(S_2 - S_1)/\ln(C_1/C_2) \quad (4)$$

In equations 3 and 4, $\lambda = 0.0936\ \text{SEC}^{-1}$, $S_2 - S_1$ is a known physical dimension of the sonde 24 and C1 and $C_2$ are the measured count rate quantities. Equation 4 then states that the linear flow velocity $v$ can be determined without any knowledge of the flow geometry or the distance R measured from the center of the sonde to the center of the water flow 23.

In measuring the flow of water within or behind casing the volume flow rate V, rather than the linear flow rate $v$, is the primary quantity of interest. If the volume flow rate V may be accurately determined, the decision on whether to perform a cement squeeze (or improved cementing job) to prevent fluid communication between fresh water sands and producing oil formations may be made. It will be apparent to those of skill in the art that if the cross sectional area F of the flow rate is known, such as would be the case for flow within a well casing, then the volume flow rate is simply given by equation 5 as:

$$V = v \cdot F \quad (5)$$

However, for flow in cement channels behind the casing, F is not known and is virtually impossible to measure. It is therefore necessary to relate $v$, the quantity which can be determined from equation 4 to V, using some other parameter than F which may be either measured or estimated within an acceptable degree of accuracy. The parameter R, the distance from the center of the sonde to the center of the flow, can be used for this purpose.

It is assumed that the neutron flux, $\phi_n$, that irradiates a given incremental volume of water decreases in intensity as a function of $1/R^2$ as the volume increment is moved a distance R from the source. Similarly, it is assumed that the radiation detected by the detector decreases as a function of $1/R^2$ as the distance R increases from the detector.

Making the above two assumptions, then the term K(R) of equation 2 may be expressed as:

$$K(R) = P/R^4 \quad (6)$$

where P is a calibration constant. Equation 6 arrived at in this manner is only an approximate equation based on the above assumptions. However, laboratory experiments have confirmed that to a good approximation Equation 6 is representative of the behavior of the function $K(R)$.

Using equations 6 and 2, we can write the volume flow rate V as:

$$V = \frac{C_i R^4 e^{+\lambda S_i/v}}{Q(e^{\lambda a/2v} - e^{-\lambda a/2v})(e^{\lambda b/2v} - e^{-\lambda b/2v})} \quad (7)$$

where $Q = p.f_i$ and $i = 1$ or 2 (representative of the dual detectors). Equation 7 states that if $v$ is obtained from equation 4 and $R$ is known, or can be estimated, then the volume flow $V$ may be obtained from the count rate recorded in either detector 22 or 25 (1 or 2 of equation 7) by using the corresponding value of $S_i$. Two separate techniques for determining R will be disclosed subsequently herein.

The foregoing discussion has illustrated that by using a well logging sonde containing a 14 MEV neutron source and two gamma ray detectors that the linear flow velocity $v$ can be obtained independent of the flow geometry and position of the moving water if the water flow is parallel to the axis of the logging sonde. Similarly, the theory has indicated that the volume flow $V$ can be obtained if the cross sectional area $F$ of the flow is known (such as would be the case of flow within well casing) or if the distance from the center of the sonde to the center of the water flow can be measured or estimated with acceptable accuracy. In the case of water flowing in a cement channel or annulus, an estimate of R that is within the cement sheath surrounding the casing would be reasonable.

In considering the applications and limits of water flow detection behind casing, it is necessary to examine the accuracy to which $v$ can be measured. Recalling that equation 4 is used to compute $v$ and that equation 4 contains $C_1/C_2$ which is the ratio of counts recorded in the near and far detectors of a flow detection system as illustrated in FIG. 2, it should be noted that the ratio $C_1/C_2$ has associated with it an inherent statistical error since the nuclear decay process of the nitrogen 16 isotope is statistical in nature. This statistical error in $C_1/C_2$ is an inverse function of the magnitude of $C_1$ and $C_2$. The error in the ratio $C_1/C_2$ is therefore affected by any parameter which affects the magnitude of $C_1$ and $C_2$. Parameters such as the source to detector spacings $S_1$ and $S_2$, the distance R from the center of the sonde to the center of the flow, the cross sectional area $F$ of the flow, the efficiencies of the gamma ray detectors $G$, the counting time interval T, the neutron flux output $\phi_n$ and the background gamma ray counts recorded under no flow conditions all can effect the measurement. It should be noted that although most of these parameters do not appear directly in equation 4 and therefore do not effect the magnitude of $v$, they do effect the accuracy and precision to which $v$ can be measured.

PULSED vs CONTINUOUS NEUTRON SOURCE OPERATION

Referring now to FIG. 3, a typical set of gamma ray energy spectra recorded under water flow and no water flow conditions is illustrated. The intensity of detected gamma rays at a single spaced detector is plotted as a function of energy in FIG. 3. The 7.12 and 6.13 MEV gamma ray photopeaks characteristic of N-γ decay and their corresponding pair production escape peaks are well defined under flow conditions. Some peak structure is also visible, it will be noted, under the no flow conditions. This results from the activation of oxygen 16 in the formation and the borehole in the vicinity of the source and is recorded by the detector even at a spacing of 34 inches as used for the data in FIG. 3 and 4. This background spectrum also contains radiation from thermal neutron capture gamma rays from the formation, casing, and sonde. It will be seen that this source of background radiation can be eliminated by pulsing the neutron source in the manner to be subsequently described.

Most prompt neutron caused gamma radiation will occur within 1 millisecond after the cessation of a pulse of neutrons. If, for example, the neutron source is turned on for 1 millisecond and gamma ray detection is delayed for 3 milliseconds subsequent to the cessation of the neutron burst before the detectors are activated, then the prompt neutron caused gamma radiation will decay to a negligible level. By then counting the oxygen activation induced gamma radiation which remains for approximately 6 milliseconds, the relatively high level background radiation as illustrated in FIG. 3 may be significantly reduced. This entire pulse-delay-count cycle is then repeated approximately 100 times per second. Of course, it may be desired for other reasons to operate the neutron source in a continuous mode and this is possible as illustrated by FIG. 3, but is subject to higher background counting rate.

Although the duty cycle of the neutron source under pulse mode operation conditions is only 10 percent in this mode of operation, the neutron output while the source is on is approximately a factor 10 times greater than the continuous neutron output if the source is operated continuously. Thus, the integrated neutron output is approximately the same in pulsed and continuous modes of operation. Under pulsed conditions the duty cycle of the detectors is approximately 60 percent (i.e., 6 of 10 milliseconds). If the count acceptance energy window illustrated in FIG. 3 (approximately 4.45 MEV to approximately 7.20 MEV) used for the continuous mode operation were used for the pulsed mode operation, the net counting rate from the decay of the unstable isotope $N^{16}$ would be reduced to approximately 60 percent of that for the continuous mode. However, under pulsed conditions, essentially none of the prompt neutron gamma radiation is recorded. Since there is no major component of element activation radiation other than that from the unstable $N^{16}$ isotope above 2.0 MEV, it is possible to widen the count acceptance energy window when using the pulsed mode from approximately 2.0 to approximately 7.20 MEV. This change of range of the counting energy window will thus include additional counts from Compton scattered, energy degraded, 6.13 and 7.12 MEV gamma radiation due to the oxygen activation and will thereby increase the count rate to offset the losses due to the approximately 60 percent duty cycle of the detectors in this pulsed mode of operation. FIG. 4 illustrates dramatically the reduced background effect by using the pulsed mode of operation. In the illustration of FIG. 4 the same source detector spacing (34 inches) is utilized as in FIG. 3 and the broadened counting energy window at the detector as previously mentioned is utilized.

To summarize, by operating the neutron generator in a pulsed mode of operation the magnitude of the signal from the oxygen activation reaction remains approximately the same while the background radiation is reduced substantially by eliminating the recording of prompt N-γ radiation. This increase in the signal to noise ratio of the desired counting signal reduces the statistical error of the quantity $C_1/C_2$.

Equation 2 shows that the counting rate at a detector C varies as $e^{-s/v}$. This indicates that in order to maximize counting rate C and thus minimize the statistical error in the measurement of $v$, that the distance to the detector S should be as small as possible. However, in considering the two detector flow meter sonde of FIG. 2, equation 4 indicates that if the distance between the two detectors ($S_2-S_1$) becomes too small, then $v$ becomes insensitive to the ratio of counting rates $C_1/C_2$. It is thus necessary to strike a practical compromise in the selection of the source detector spacings $S_1$ and $S_2$ in order to minimize the statistical and non-statistical errors in $v$. Appropriate experimental techniques have been derived for determining optimum spacings $S_1$ and $S_2$. These spacings for typical pulsed neutron sources as used in the system of the present invention are pointed out with further particularity in the subsequent description of the equipment. While the theory of operation of the instrumentation is still valid at other spacings, it will be appreciated by those skilled in the art that the spacing distances given in the following descriptions are not obvious without an experimental basis.

TECHNIQUES FOR DETERMINING R

Recalling equation 7, it will be observed that it is possible to measure the volume flow rate of the water behind the casing provided a technique for determining R, the radial distance from the center of the detectors to the center of the water flow, may be determined or estimated. For reasons which will become apparent in the subsequent descriptions, sometimes it is not possible to estimate R to the accuracy necessary to be able to predict the volume flow rate V. However, it is possible to measure R by certain techniques which will now be described in more detail.

Figure 5:
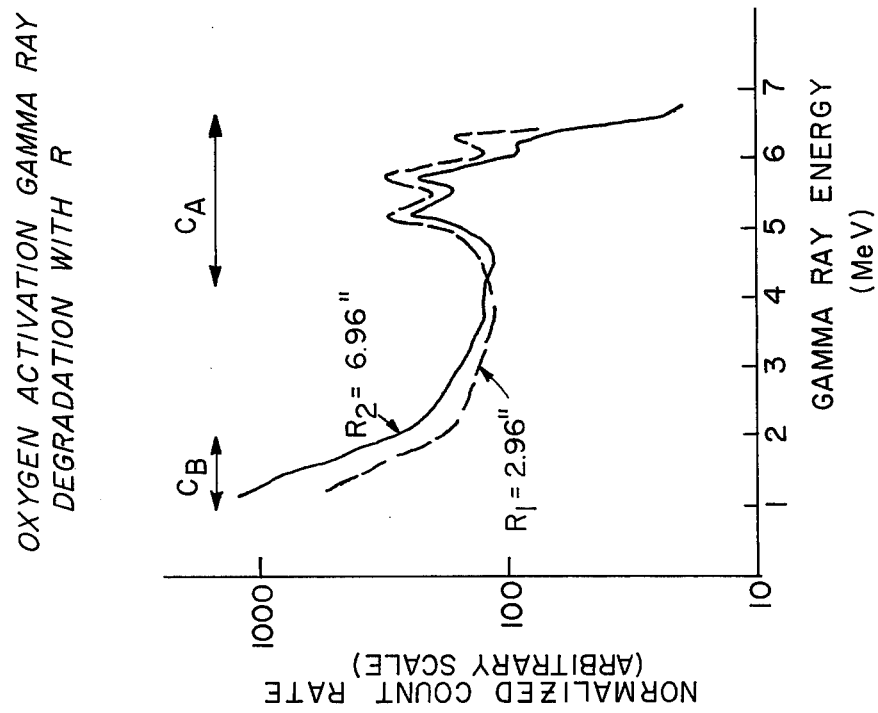
FIG. 5 is a graphical representation showing gamma ray spectral degradation as the source of gamma rays is moved to a different distance from a detector.

The first technique for determining R may be considered a gamma ray spectral degradation technique. Referring now to FIG. 5, two gamma ray spectra resulting from the decay of radioactive nitrogen 16 produced by oxygen activation with a water flow meter sonde of the type contemplated for use in the present invention is illustrated schematically. The spectra of FIG. 5 are taken at the same detector in the flow meter sonde and illustrate the counting rate at the detector resulting from a water flow whose center is $R_1$ and $R_2$ inches from the center of the detector. The broken curve in FIG. 5 illustrates a gamma ray spectrum resulting from the decay of radioactive nitrogen 16 and a water flow whose center is at a distance R equal approximately 2.96 inches from the center of the water flow sonde detector. In the illustration of FIG. 5, thus $R_2$ is greater than $R_1$. Also illustrated by the double ended arrows in FIG. 5 are two energy range counting windows A and B. Window A includes the 7.12 and 6.13 MEV photo and escape peaks from the radioactive nitrogen 16 which are primary radiation which reach the detector without Compton scattering collosions primarily. Window B is a radiation energy window for detecting primary gamma radiation which has been degraded in energy through collosions (Compton scattering).

If $C_A(R)$ is defined as the count rate recorded in window A for arbitrary R and $C_B(R)$ is the count rate recorded in window B for arbitrary R, it can be seen that:

$$C_A(R_2)/C_B(R_2) < C_A(R_1)/C_B(R_1) \text{ For } R_2 > R_1 \quad (8)$$

The ratio inequalities $C_A/C_B$ in equation 8 which result in this manner are due to the fact that a larger fraction of the primary 6.13 and 7.12 MEV gamma radiation is degraded by collosions with the intervening material as the distance R between the activated water flow and the detector is increased. Thus by calibrating a system for water flow detection in terms of the spectral degradation as a function of the radial distance R, a tool is provided for determining the unknown radial distance R to the center of flow. This distance R may then in turn be used in connection with equation 7 for quantitatively determining the volume water flow rate.

Figure 6:
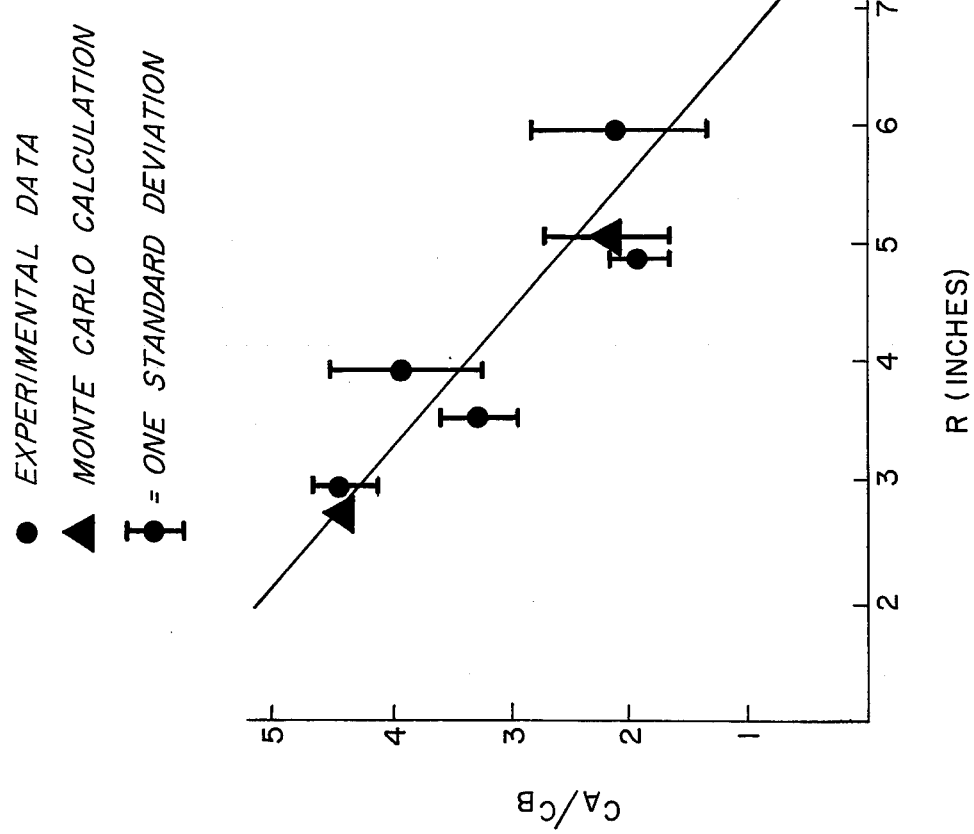
FIG. 6 is a graphical representation showing the count rate ratio at two spaced detectors as a function of distance.

Referring now to FIG. 6, the results of an experimental calibration of the ratio of counting rates $C_A/C_B$ which were measured in known test flow conditions as a function of R are plotted with the standard deviation error bars associated therewith. Also plotted in FIG. 6 are the results of a monte carlo computer calculation for a 6.13 MEV point gamma ray source at various distances R from a gamma ray detector. The monte carlo calculations are based on probability theory and are used to predict the uncollided or undegraded gamma ray flux as a function of the radial distance of the source to the detector using the known laws of physics concerning the Compton scattering phenomena. It will be noted that there is excellent agreement between the experimental curve and the monte carlo calculations as the data points of FIG. 6 indicate.

In the two detector water flow sonde to be subsequently described in more detail, the ratio of the counting rates at the two selected energy windows $C_A$ and $C_B$ from the near detector can be measured. The distance R from the center of the water flow to the center of this detector may then be determined by comparing the background corrected count rates at these two energy windows with the relationship illustrated in FIG. 6 in order to determine R, the distance from the center of the detector to the center of the water flow. The counting rate ratio at the near detector is used for this purpose due to the fact that it will have a higher counting rate and will thus give better statistical accuracy. It will be appreciated, however, that this relationship will also hold true for the A detector and, if desired, the A detector count rate ratio may be used alternatively or supplementary to the near detector count rate ratio for this purpose. The counting rates at the two different detectors can be used to compute $v$ the linear flow rate, and then by using the relationship of equation 7, the volume flow rate V may be inferred once R is determined in this manner.

Figure 8:
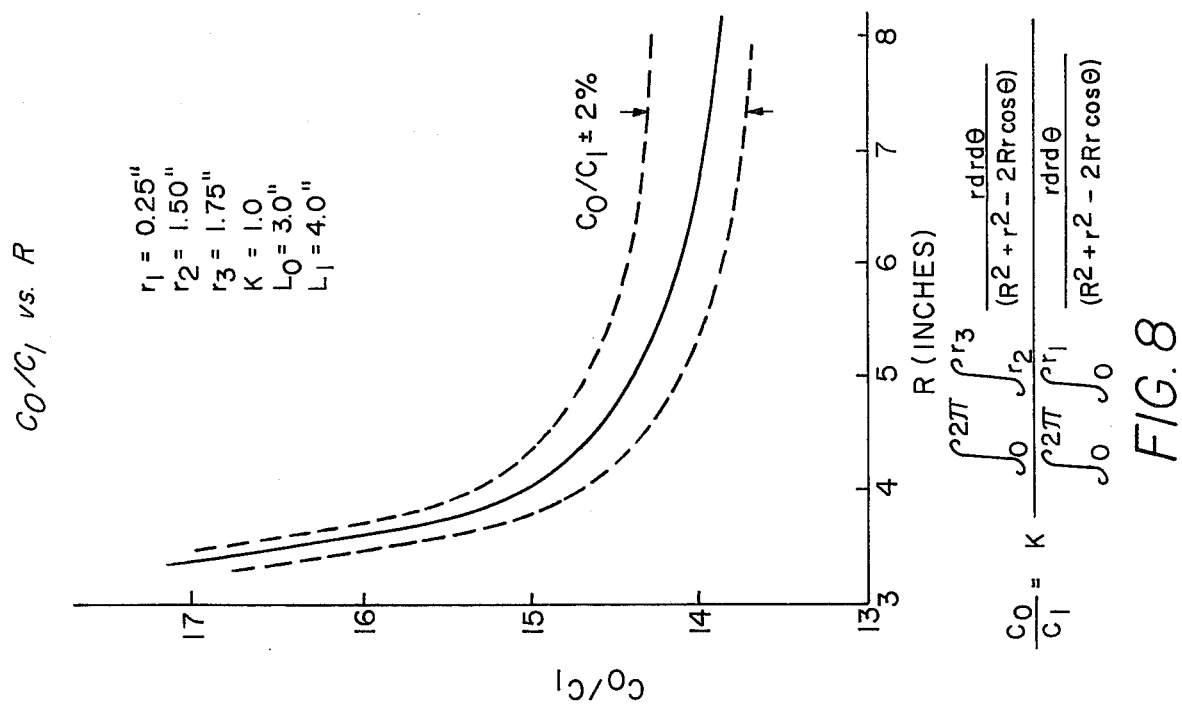
FIG. 8 is a graphical representation of the response of the detector of FIG. 7 as a function of the distance of the detector from a gamma ray source.
Figure 7:
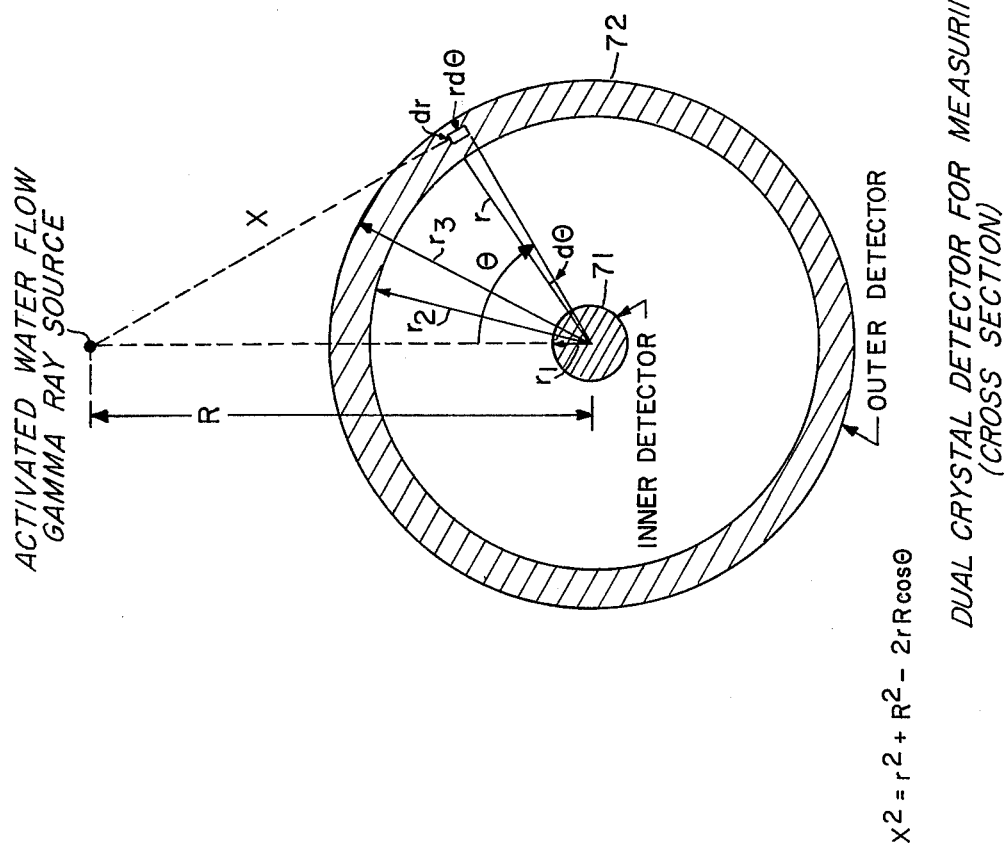
FIG. 7 is a schematic cross sectional view of a dual concentric cylinder gamma ray detector.

Referring now to FIGS. 7 and 8 an alternate technique for measuring R is illustrated schematically. In FIG. 7, a cross sectional view of a dual crystal gamma ray detector is illustrated schematically. This detector comprises an inner crystal 71 generally cylindrical in shape and comprising a sodium or cesium iodide activated detector crystal of radius $r_1$ and length $L_I$ which is positioned in the center of a cylindrical shell crystal 72. The detector crystal 72 also comprises a sodium or cesium iodide thallium-activated crystal of the type known in the art for detecting high energy gamma rays and having an inside radius $r_2$ and an outside radius $r_3$. Two separate photomultiplier tubes can be independently optically coupled to detector crystals 71 and 72 and used to detect independently scintillations or light flashes resulting from the interaction of the high energy gammy rays with the crystalline structure so that two separate counting rates $C_O$ and $C_I$ may be detected from the two cylindrical detectors 72 and 71, respectively.

Considering the activated water flow radioactive nitrogen 16 as a point gamma ray source located R inches from the center detector 71, it may be shown that the ratio of counts $C_O$ recorded in the outer crystal to $C_I$, the counts recorded in the inner crystal, is given by the relationship of equation 9.

$$\frac{C_o}{C_I} = K \frac{L_o \int_0^{2\pi} \int_{r_2}^{r_3} \frac{rdrd\theta}{(r^2 + R^2 - 2rR\cos\theta)}}{L_I \int_0^{2\pi} \int_0^{r_1} \frac{rdrd\theta}{(r^2 + R^2 - 2rR\cos\theta)}} \quad (9)$$

In equation 9, K is a constant which includes a shielding effect of the outer crystal on the inner crystal for the gamma ray flux. If equation 9 is numerically integrated as a function of R using the dimensions given on the drawing of FIG. 8, a curve such as the solid curve of FIG. 8 is obtained.

FIG. 8 illustrates a graphical representation of the ratio $C_O/C_I$ as a function of R, the solid curve using the dimensions shown on the figure. It can be seen from FIG. 8 that R may be obtained from the ratio $C_O/C_I$ if this ratio can be measured with sufficient accuracy. The two dotted line curves in FIG. 8 comprise the envelope of ±2 percent accuracy in determining the ratio $C_O/C_I$ and illustrate the fact tht R may be determined to within one-half inch if R is less than or equal to 5 inches by measuring the ratio $C_O/C_I$ to the accuracy ±2 percent. If it is desired to maintain better than ±½ inch accuracy in the measurement of R, then a longer counting interval is required in order to obtain the ratio $C_O/C_I$ to an accuracy of better than 2 percent.

Summarizing this technique for measuring volume flow rate V, the detection of the volume flow rate V may be obtained from the relationship of equation 7 provided that the water flow may be either estimated or measured by either of the foregoing described techniques. The linear flow rate v is obtained in the manner previously described. Under some water flow conditions R may be measured with accuracy by one of the foregoing techniques and then used in order to compute V, the volume flow rate. In some instances, it may be necessary to estimate R. This may be done by assuming that the water flow is in a channel or void in the cement annulus surrounding the casing outside the well borehole. In such a case, R could be estimated to be ½ to 1 inch greater than the known casing O.D. In this case the volume flow of water may then be similarly obtained from the relationship of equation 7. In either instance, techniques for determining the linear flow rate v and a quantitative measure of the volume flow rate V of the water in a cement channel or annulus void behind the casing in a well borehole have been described in the foregoing sections. The following sections will deal in more detail with the water flow detection systems and with operational measurement techniques which may be used under different borehole and producing conditions for detecting and measuring water flow inside or outside of casing in a well borehole.

DESCRIPTION OF THE EQUIPMENT

The equipment used to make the water flow measurements previously discussed relies on the activation of the oxygen 16 nuclei by the caputre of neutrons with energy equal to or greater than 10 MEV. This necessitates the use of a neutron generator which can generate a sufficient intensity of neutrons having an energy of 10 MEV or greater to perform the measurement. The most commonly available such neutron generators are those relying on the deuterium-tritium reaction to generate this flux of high energy neutrons at a sufficient intensity to perform measurements of this type. The deuterium-tritium reaction neutron generators are generally referred to as accelerator type neutron sources.

Accelerator type neutron sources generally comprise an evacuated envelope having a target materials at one end thereof which is impregnated with a high percentage of tritium. This target is kept at a high negative potential (approximately 125 KV) with respect to the source of deuterium nuclei which are to be accelerated onto it. At the opposite end of the evacuated container is an ion source and a source of deuterium nuclei usually termed replenisher. In operation, such accelerator sources generate a concentration of deuterium ions from the ion source which are focused by electrostatic lenses into a beam and accelerated by the high negative potential onto the target material which is impregnated with the tritium nuclei. Due to the high acceleration voltage, the electrostatic Coulomb repulsion between the deuterium nuclei and the tritium nuclei is overcome and the thermo-nuclear fusion reaction takes place generating a relatively high intensity of neutrons having an energy of approximately 14 MEV.

In constructing the equipment to perform the water flow measurements previously discussed, since it is necessary to use an accelerator type neutron source, a problem arises in the physical construction of the downhole portion of the system. This problem is caused by the fact that a high voltage power supply is necessary to generate the approximately 125 KV potential required by the neutron source for the acceleration of the deuterium ions. Perhaps the most efficient such high voltage power supply is a multiple stage Cockroft-Walton Voltage Multiplier Circuit. A circuit arrangement for generating a high voltage such as that required by the accelerator tube when placed in a well logging instrument requires considerable longitudinal extent in order to stack the voltage multiplying stages longitudinally along the length of the well logging instrument while providing sufficient insulation about these voltage multiplying stages to prevent voltage breakdown of the insulators.

Referring now to FIGS. 9A, 9B, and 9C, the downhole sonde for the water flow detection measurement is illustrated schematically. The sonde is made up of several component sections which may be physically rearranged to perform steps in the detection of the water flow behind the casing according to the principles previously discussed. The upper end of the sonde is provided with a head member 91 approximately 10 inches in longitudinal extent. A control and detector electronics section 92 is attached to the head section and is approximately 75 inches in longitudinal extent. The detector section 93 houses two gamma ray detectors which may comprise thalium activated sodium iodide crystal detectors (approximately 2 by 4 inch cylinders in appearance) and an iron shielding member which is interposed on the end opposite the neutron generator. Below the detector section in FIG. 9A is the neutron generator and power supply section housing the neutron generator 94 and the 125 KV high voltage power supply 95. The spacings preferred between the neutron source and the detectors in the assembled instrument are, respectively, 23 and 42 inches as shown in FIG. 9. The neutron source and power supply section is approximately 94 inches in length. Finally, at the lower end of the sonde is a protective bull plug assembly 96 which serves to protect the lower extremity of the sonde should it come into contact with the bottom of the borehole or some obstruction therein.

The problem which arises is due to the longitudinal extent (94 inches) of the high voltage power supply. It will be realized by those skilled in the art that in order to detect water flow in an upward direction that the flow must first pass the neutron source and then subsequently pass the detectors in its movement. This implies the configuration illustrated in FIG. 9B where the detector section 93 of the well logging instrument is placed above the high voltage power supply and neutron generator section 94 and 95. However, in order to detect water flow in a downward direction, the configuration illustrated in FIG. 9C is required wherein the downward water flow must first pass the neutron source and then pass the gamma ray detectors in order to make the flow measurement as previously described. In this configuration, the neutron source-power supply section 94, 95 must be placed above the detector section 93 on the downhole instrument.

Since the gamma ray detectors must be located within a reasonable distance of the neutron generator target, the tritium impregnated target of neutron source 94 must be located as close as possible to the shield portion of the detector section 93 of the instrument. This requires the design of a neutron source 94 power supply 95 section which is reversible (i.e., connectable to operate from either end) when going from the configuration shown in FIG. 9B to that shown in FIG. 9C in order to detect water flow in an upward or a downward direction, respectively. Similarly, all of the component portions of the downhole instrument of FIG. 9 are constructed in a modular fashion. These modules may be joined by screw type fluid tight assemblies and sealed against the incursion of borehole fluid by sealing means at each of these junctions.

The downhole sonde illustrated schematically in FIGS. 9A, B, and C is also provided with centralizer members 97 which may comprise cylindrical rubber arms or the like which extend outwardly into touching engagement with the inside walls of the well casing when the sonde is lowered into the borehole for measuring purposes. These centralizer arms 97 maintain the body of the sonde in a central position within the casing in order to assist in preserving cylindrical symmetry of the measurements. If the sonde were able to lie against one side of the well casing, it could fail to detect water flow on the opposite side of the casing member because of a lack of sensitivity due to the increase distance from the neutron source and detectors to the flowing water.

The electronics section 92 of the downhole sonde functions, as will be described in more detail subsequently, to control the operation of the neutron source 94 and to furnish high voltage power for the operation of the detectors which are contained in the detector section 93 of the sonde. The electronics section 92 also serves to provide synchronization (or sync) pulses at the beginning of each neutron burst. The electronics section 92 also contains circuit means to transmit electrical pulse signals from the detectors and sync pulse signals up to the well logging cable to the surface.

Referring now to FIG. 10, a well logging system in accordance with the concepts of the present invention is shown in a borehole environment with the surface equipment portion thereof and is illustrated schematically. A downhole sonde 104 which in practice is constructed in the modular manner illustrated with respect to FIGS. 9A, 9B, and 9C, is suspended in a well borehole 100 by an armored well logging cable 111 and is centralized by centralizers 105 as previously described with respect to the interior of the well casing 102. The cased borehole is filled with a well fluid 101. The downhole sonde of FIG. 10 is provided with dual gamma ray detectors 124 and 125 which are shown mounted in the configuration shown in FIG. 9C for detecting water flow in a downward direction behind the casing 102. The downhole sonde is also provided with a 125 KV power supply and neutron generator 126 of the type previously described. The electronics section 127 of the downhole instrument 104 corresponds to electronics section 92 of FIGS. 9A, 9B, and 9C.

Earth formations 123, 107, 108, and 109 are penetrated by the borehole 100. A cement channel 110 on one side of the cement sheath 103 of the cased wellbore is illustrated allowing undesired fluid flow in a downward direction from a water sand 107 which contaminates a producing sand 109 separated from the water sand 107 by a shale layer 108. With the well logging instrument 104 placed in the position shown and with the detector source configuration illustrated in FIG. 10, the instrument 104 is capable of detecting undesired water flow from the water sand 107 through the cement channel 110 into the producing sand 109. Perforations 106 in the casing 102 allow fluid from the producing sand to enter the well borehole 100 as well as allowing the undesired water flow down the cement channel 110 to enter the borehole 100. In the configuration shown in FIG. 10, high energy neutrons from the neutron source 126 penetrate the steel casing 102 and activate the elemental oxygen in the water flow from water sand 107 through cement channel 110. The water flowing in channel 110 then continues past detectors 124 and 125 sometime later and gamma rays resulting from the decay of the radioactive nitrogen 16 are detected in the manner previously described by the detectors 124 and 125. Electrical pulses whose height is proportional to the energy of the impending gamma rays detected by the detectors 124 and 125 are transmitted to the electronic section 127 of the downhole instrument and from there coupled to the well logging cable 111 conductors and transmitted to the surface in a form which will be described in more detail subsequently.

Figure 11:
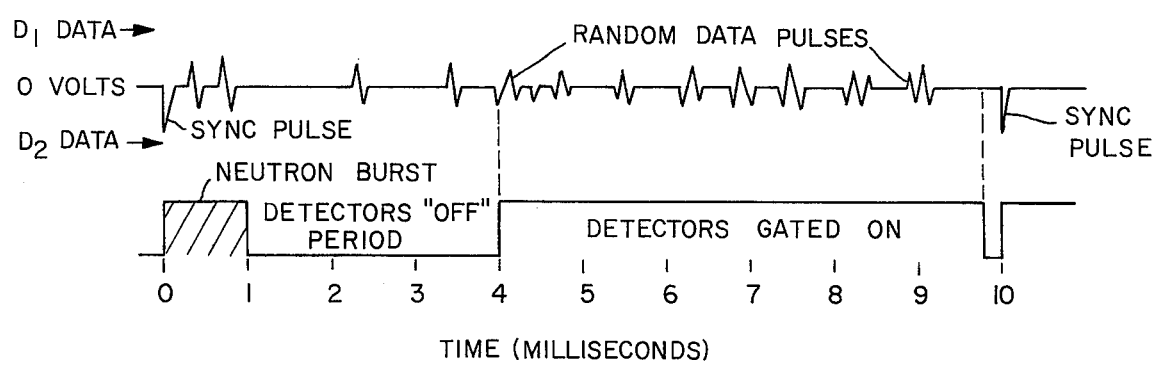
FIG. 11 is a schematic diagram illustrating the timing and data transmission format of the water flow detection system of the invention.

Referring now to FIG. 11, a timing chart for the instrumentation of FIG. 10 is shown together with the pulse wave forms appearing on the logging cable 111. The electrical pulse signals representative of the energy of the gamma rays at the detectors 124 and 125 are illustrated in the top portion of the drawing of FIG. 11 while the lower portion of the drawing of FIG. 11 is a schematic representation of the timing involved in the operation of the system of FIG. 10. It will be observed as previously described, that a 1 millisecond duration neutron burst is initiated at time $T = O$ and extends through time $T = O$ plus 1 millisecond. Simultaneously with the initiation of the neutron burst in the downhole instrument, a large amplitude negative polarity synchronization (or sync) pulse is generated by the electronic section 127 of the downhole instrument and coupled to the conductors of well logging cable 111. The amplitude of the sync pulse is made greater than any possible data pulse amplitude from the detectors. Electrical pulse signals representative of randomly occurring gamma rays impinging upon detectors D1 and D2 in the downhole instrument 104 are coupled continuously to conductors of the well logging cable 111 for transmittal to the surface by the electronic section 127 also. The pulses from detector D1 are applied to the cable conductor as negative polarity voltage pulses while pulses representative of the gamma rays detected at detector D2 are applied to the cable conductor as positive polarity voltage pulses. At the surface a pulse separator 115 is used to discriminate the detector D1 pulses from the detector D2 pulses on the basis of their electrical polarity. The negative polarity pulses are supplied as input to a synchronization pulse detector 118 and as one input to a time gate 116. The positive going pulses from detector D2 are supplied as one input to a time gate 117.

The synchronization pulse detector 118 detects the large amplitude negative sync pulses on the basis of amplitude and supplied conditioning pulses to the time gates 116 and 117 beginning at a time 4 milliseconds after the initiation of the neutron burst. Thus, there is a 3 millisecond time interval between the end of the neutron burst and the conditioning of time gates 116 and 117 by the synchronization detector and timing pulse generator circuit 118.

The output of both detectors D1 and D2 are continuously supplied to the well logging cable 111 but are thus prevented from reaching subsequent circuitry by the action of time gates 116 and 117 which allow the randomly occurring data pulses to reach the processing circuitry only during the 5,85 millisecond duration interval beginning at 4 milliseconds after $T = O$ and extending until 9.85 milliseconds after $T = O$ as illustrated in the timing chart of FIG. 11.

When time gates 116 and 117 are enabled by the conditioning pulse from sync pulses detector 118, the data pulses from the downhole detector pair 124 and 125 are coupled as inputs to pulse height analyzers 119 and 120 respectively. These pulse height analyzers perform the spectral energy separation of gamma rays detected by the downhole instrument 104 at each of the detectors 124 and 125 according to the energy windows previously described. Thus the spectral degradation technique previously described may be used to derive the distance R from the center of the detector to the center of the flowing water in the cement channel 110 by the method previously described with respect to the calibration chart of FIG. 6. For this purpose, the energy discriminated pulse height information from pulse height analyzers 119 and 120 is supplied to a small computer 121 which may comprise a general purpose digital computer of the type PDP-11 which is manufactured by the Digital Equipment Corporation of Cambridge, Mass. The computer 121 may then, when supplied with the energy discriminated information, apply the count ratio technique described previously with respect to the relationship of FIG. 6 in order to determine R the distance to the center of the water flow from either or both of the detectors.

It will be appreciated by those skilled in the art that given the previously discussed relationships for determining R that such a general purpose digital computer may be programmed, for example in a commonly used programming compiler language such as FORTRAN or the like, to perform the calculations necessary to derive the water flow velocity $v$ and R. Output signals representative of this desired information are conducted from the computer 121 to a recorder 122. The recorder 122, as indicated by the broken line 113, may be electrically or mechanically coupled to a sheave wheel 112 in order to display the quantities of interest as a function of the depth of the well logging instrument in the borehole. Similarly, the count information processed by the multi-channel pulse height analyzer 119 and 120 may be conducted to the data recorder 122 and plotted or displayed as a function of the borehole depth of the logging instrument 104.

METHODS OF OPERATION

The foregoing descriptions have concerned the theory and equipment which may be utilized to detect undesired water flow in cement channels or voids behind the casing in a cased wellbore. The remaining sections discuss the methods of operations in various types of wellbore conditions for applying the methods and apparatus which have been described previously. The first such condition for the operation of a flow detection system utilizing the concepts of the present invention will concern the operation of such a system in a wellbore wherein the borehole is cased and is producing fluid under formation pressure through perforations directly into the wellbore. This situation corresponds to the borehole described schematically with respect to FIG. 10.

DETECTIONS OF UNDERSIRED FLOW IN PERFORATED CASING COMPLETION

Referring to FIG. 10, downhole instrumentation which has been previously described is shown in a casing perforation completion. Undesired water flow from a water sand 107 is communicated along a cement channel 110 past a shale break 108 and into a producing sand 109 where it is allowed to enter the wellbore 100 through casing perforations 106. Although FIG. 10 illustrates the case where the undesired water production evolves from downward flowing water from water sand 107 into the producing sand 109, it will be appreciated by those skilled in the art that an equally likely probability is undesired water communication along a similar cement channel (not shown) from a water sand which lies below the producing horizon 109. In practice, it will not usually be the case that the direction from which the undesired water cut is arriving is known with precision. In fact, it is the purpose of the instrumentation and methods of the present invention to enable the detection of such channeling or undesired fluid flow from either direction.

It will be recalled that it is necessary to activate the elemental oxygen nuclei comprising the water flow in order to enable the production of the radioactive nitrogen 16 whose radioactive decay is detected by the longitudinally spaced detectors 124 and 125 in the downhole instrument 104. Since the direction of fluid flow may not be accurately anticipated, it is therefore necessary to use modular instrumentation which has previously been described in detail with respect to FIGS. 9A, 9B, and 9C which may be assembled to detect water flowing in an upward direction or water flowing in a downward direction behind the casing.

It has been found through experimental usage of such instrumentation that such a tool is highly discriminative in its detection of water flow direction. In practice it has been found that if the instrument is connected in the manner to detect water flow in an upward direction, that its response to water flow in a downward direction over an interval of wellbore being investigated is approximately that illustrated with respect to FIG. 4 for the "no water flow run" of the instrumentation when a pulsed neutron source is used or with respect to the "no flow run" of FIG. 3 when a continuous neutron source is used. Thus, the instrument has been found to effectively precisely discriminate the direction of water flow past the neutron source 126 according to whether the longitudinally spaced detectors 124 and 125 are placed above or below neutron source 126. In order to detect water flowing upwardly, the detectors are placed above the neutron source and in order to detect water flowing downwardly, the detectors are placed below the neutron source.

Bearing this directional discrimination in mind and referring again to the cased wellbore completion illustrated in FIG. 10, the following sequence of operations would be required in order to precisely located the undesired water flow or channeling condition illustrated in FIG. 10. First the instrumentation would be connected with the longitudinally spaced detectors 124 and 125 located below the neutron source 126 in order to detect water flowing downwardly as shown in the illustration of FIG. 10. The instrument would then be lowered to a depth slightly above the perforated interval 106 and measurements of the radioactive nitrogen 16 decay in the downwardly flowing water in cement channel 110 would be made over a suitable time interval, for example, approximately 5 minutes. While the downhole tool 104 is located slightly above the perforated interval 106, it will remain insensitive to any fluid flow within the casing 102 in an upward direction as such flow would pass the detectors 124 and 125 initially and would not pass the neutron source 126 prior to passing the detectors. Thus, only the downward flowing water in the cement channel 110 would be activated and detected by the downhole instrumentation in this configuration.

The modular downhole instrument is then removed from the wellbore and the source-detector configuration reversed, placing the detectors above the neutron source on the body of the well logging sonde as shown in FIG. 9C. The instrument is then lowered to a point slightly below the perforations 106 in the wellbore and the oxygen activation measurement cycle is repeated for a suitable time interval. This enables the detection of any water flowing upwardly along cement channels adjacent to the casing. In this configuration, the downhole instrumentation remains insensitive to any produced fluid within the casing 102 moving in a downward direction past the detectors 124 and 125.

In this manner, the response of the detectors to any undesired fluid flow along cement channels or voids can be utilized in the relationship according to equation 4 in order to determine the linear flow velocity $v$ of the undesired water flow in the cement channel. The direction of such flow would, of course, also be defined in this operation.

In a like manner, the volume rate V of any detected undesired fluid movement may be obtained by estimating or measuring the distance R to the center of the flow from the center of the detectors by either of the techniques described previously. If it is not desired to pursue such measurement techniques the approximate volume flow rate V may be estimated by assuming the distance R to be from ½ to 1 inch greater than the outside diameter of the casing. Then using the relationship given by equation 7, the volume flow rate V may be quantitatively derived.

The foregoing techniques have been described in terms of stationary measurements. Perhaps this is the most accurate form for performing flow detection according to the techniques of the present invention. It has also been experimentally determined that the water flow logging system of the present invention may be operated with the well logging instrument in motion. In this case, if the instrument is moved at a slow rate which is accurately known for example, 5 feet per minute or the like, the instrument may, in the case of the example of FIG. 10, be first placed in the borehole with the detectors located below the neutron source and initially located just above the casing perforations in the area to be inspected. The instrument is then slowly lowered continuously past the casing perforations 106 for a predetermined short distance below the perforations. Similarly, the downhole tool may then by removed from the borehole, the detector source configuration reversed, and the instrument lowered to a predetermined position below the perforations 106 and moved at a slow rate in an upward direction past the casing perforations 106. This motion is continued for a predetermined distance above the perforations. In this type of operation, when the detectors 124 and 125 are located below the source, the instrument remains relatively insensitive to its motion in a downward direction. With the detectors located above the source, the instrument remains relatively insensitive to its motion in an upward direction. In this manner, it is possible to detect at least qualitatively by a continuous logging measurement any undesired fluid communication along the cement sheath and to record such as a function of borehole depth in the manner previously discussed with respect to the description of FIG. 10.

If it is desired to move the downhole instrument upwardly with the detectors 124 and 125 located below the neutron source 126 or if it is desired to move the instrument downwardly with the detectors 124 and 125 located above the neutron source 126, then the movement of the tool merely adds a constant known linear velocity term to the tool response to water flow in the direction of tool sensitivity. Since the motion speed of the tool is known prior, this constant term may be compensated for by subtracting it out in determining the linear flow velocity $v$ and the volume flow rate V in the computer system 121 of FIG. 10. Unless the speed of undesired water flow then were precisely the same as the rate at which the instrument is being moved through the borehole so that no relative motion would exist, it would still be detectable under these conditions of motion of the instrument.

DETECTION OF UNDESIRED FLUID FLOW IN CEMENT CHANNELS IN A PRODUCING WELL ON GAS LIFT

In some instances it may be desired to try to determine the location and amount of undesired fluid flow along cement channels or voids in a producing well which is completed and in production on gas lift operation. Such completion techniques are quite common in some geographical areas where relatively large amounts of natural gas are available to assist production. In these instances it is always desirable to try to measure the undesired fluid flow under producing conditions. This is due to the fact that if production in the suspected zone is stopped in order to make the measurement of undesired fluid flow, any pressure differentials which existed during production from the producing zone and which contributed to the undesired fluid flow would be lost if the zone were removed from production.

In gas lift operations, a producing zone is generally produced through a relatively small (3 inch) diameter string of production tubing which is passed through a packer anchored inside the casing at a distance of generally 50 to 60 feet above the producing perforations. Gas lift valves are installed in the production tubing string above the packer and above the perforations which function to allow production through the tubing string when the fluid level is below the valve. These valves also permit the introduction of natural gas under pressure into the annulus between the production tubing and the well casing. This pressure is used to force the well fluid up the production tubing string. The gas which is permitted to enter the production tubing forms a bubble type emulsion with the well fluid being produced from the perforations and lifts this to the surface in the production tubing due to the gas pressure.

In gas lift operation, therefore, it is readily apparent that in order to maintain producing conditions the production tubing string may not be removed from the wellbore or the action of the gas lift apparatus will be curtailed. This, of course, would stop production fluid flow and possibly alter any undesired fluid flow rendering it difficult if not impossible to detect.

In order to perform undesired fluid flow detection while maintaining production on gas lift operations, it is apparent that a well logging instrument sized and adapted to be passed through production tubing is required. Such an instrument may be built having the same configuration as that previously described with respect to FIGS. 9 and 10 and in the foregoing description. That is to say, a neutron generator tube and scintillation detectors which are appropriately sized are placed in an instrument housing which has an overall outside diameter not exceeding 1 11/16 inches. This instrument is then passed through the production tubing to the desired interval for performing the undesired flow detection.

Referring now to FIG. 12, the procedure for performing undesired fluid flow detection under gas lift completion conditions is illustrated schematically. A well casing 201 is cemented in place and a producing zone which is producing through perforations 202 is isolated from the remainder of the wellbore by a packer 203 through which a production tubing string 204 passes to communicate the produced fluid to the surface. A gas lift valve 205 is provided for appropriately introducing natural gas under pressure into the production tubing.

Figure 12A:
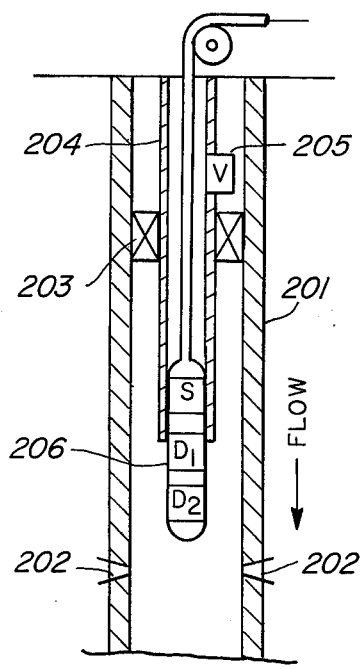
FIG. 12 is a schematic diagram illustrating a technique of water flow detection in a producing well.
Figure 12B:
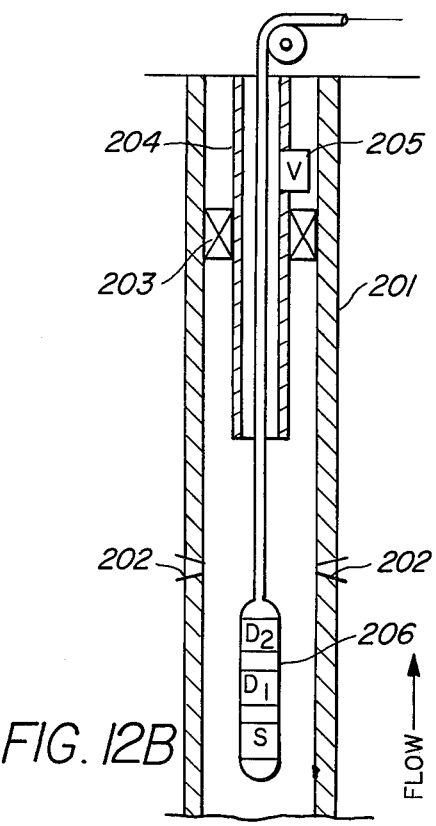

In order to detect undesired fluid flow in a downward direction, a through tubing sized instrument 206 according to the concepts of the present invention and having a source-detector configuration as illustrated in FIG. 12A is passed through the production tubing into the interval just above the producing perforations 202. With the instrumentation as shown in FIG. 12A, fluid flow in a downward direction may be discerned according to the previously described techniques in a similar manner. Similarly, referring to FIG. 12B, if the downhole instrument 206 is configured with the detectors located above the neutron source and is lowered through the production tubing string into the producing zone and lowered below the perforations 101, undesired fluid flow in an upward direction along the casing may be detected in the same manner as previously described with respect to the larger sized instrumentation.

In conducting these measurements, the downhole instrument 206 may either be positioned in a stationary manner first above and then below the perforations, with the detectors located first below and then above the neutron source in the manner previously described, or the instrument 206 may be lowered slowly past the perforations in a moving downward direction or pulled slowly upward past the perforations in a moving upward direction as previously described. In either event, the operating procedures for determining the location, linear flow velocity and volume flow rate of undesired fluid production in cement channels or voids exterior to the casing will remain similar to those described with respect to the foregoing discussions.

DETECTION OF UNDESIRED FLUID FLOW IN MULTIPLE ZONE COMPLETION WELLS UNDER GAS LIFT OPERATION

In multiple completion wells, two or more producing zones located at different depths which are isolated from each other by packers set inside the casing are produced through multiple tubing strings. In such an instance, naturally the flow from a deeper producing zone must pass through the shallower producing zone or zones within its production tubing string. As it is possible that this production from the lower producing zone will contain some amount of water cut, the detection of undesired fluid flow behind casing in the upper producing zone is complicated by this factor. The problem therefore arises of how to discriminate against the detection of the fluid flow containing water in the adjacent tubing string passing through a shallower producing zone which is isolated by packers straddling the perforations in such a shallower zone.

Figure 13A:
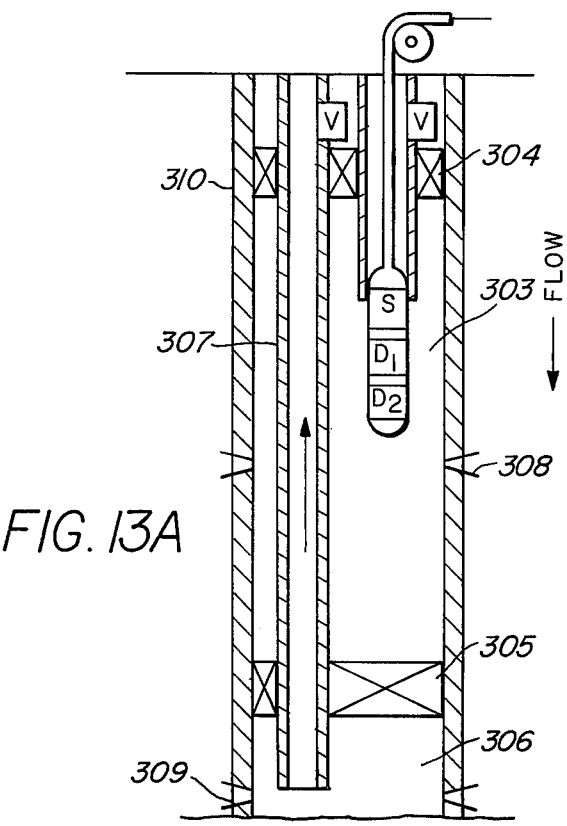
FIG. 13 is a schematic diagram illustrating a water flow detection technique in a multiple completion producing well.
Figure 13B:
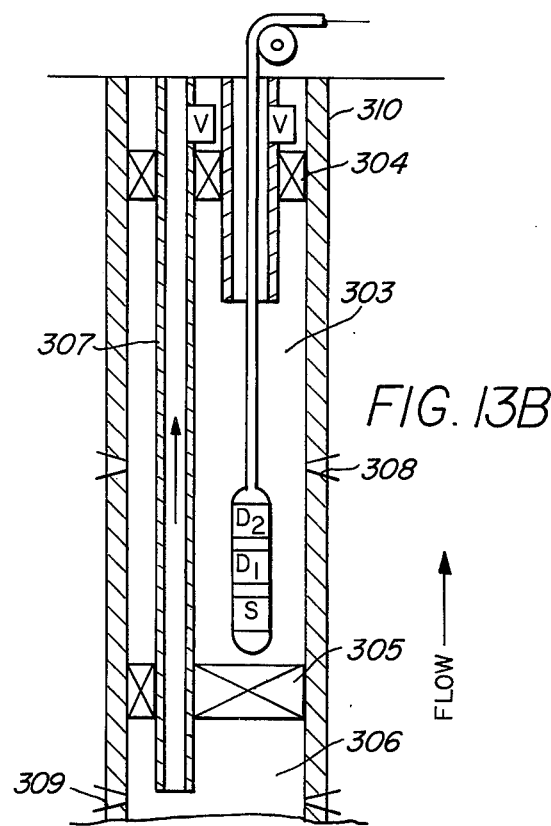

This situation is illustrated schematically in FIG. 13. In the diagrams of FIGs. 13A and 13B, a shallow producing zone 303 is isolated by casing set packers 304 and 305 from the remainder of the wellbore and a lower producing zone 306. The lower producing zone 306 is producing under gas lift operation through a tubing string 307 which passes completely through the shallower packer isolated producing zone 303. The upper producing zone 303 is producing through a set of perforations 308 while the lower producing zone 306 is producing through a second set of perforations 309.

In order to alleviate the complexity of the problem of detecting undesired fluid flow behind the casing 310 in the upper zone, the lower zone could be merely shut in to production during the measurement. However, if the two producing zones are close enough together and the undesired water cut in the upper zone is coming from a water stringer lying between the two zones, this shut in of the lower zones could affect the well flow conditions in the upper producing zone and thereby render the undesired fluid flow measurement undetectable. However, according to the techniques of the present invention, undesired fluid in the upper region which is operating on gas lift may be detected in spite of a water cut fluid component being present in the production tubing string 307 passing through this zone. The measurement technique for making this determination will, however, require some further theoretical explanation.

Recalling the previously discussed theory of the gamma ray spectral degradation due to the differing thicknesses of scattering material between the source and the detectors for water flow occurring at different distances from the detectors, and count rate C recorded in an energy region or window $i$ ($i = A,B$) of detector $j$ ($j = 1,2$) after correcting for background, may be written as $$C_{i,j} = C^T_{i,j} + C^F_{i,j} \tag{10}$$

where in equation 10, $C^T_{i,j}$ is the count rate from the water flowing in the production tubing passing through the upper zone and $C^F_{i,j}$ is the count rate from the water behind the casing in the upper producing zone of FIG. 13. It may be shown that the ratio of the two detector count rates due to the tubing flow in energy window A, is as given by equation 11:

$$\frac{C^T_{A,1}}{C^T_{A,2}} = e^{K/v_T} \tag{11}$$

where
$K = \lambda \Delta S$
$\Delta S$ is the detector spacing
$v_T$ is the linear velocity of fluid flow in the tubing string (in/sec)
and
$\lambda = 0.0936$ sec$^{-1}$ Similarly, the ratio of the count rates at the two detectors due to the flow of water outside the casing in energy window A may be shown to be given by equation 12:

$$\frac{C^F_{1,A}}{C^F_{2,A}} = e^{K/v_F} \tag{12}$$

where $v$ is the linear flow velocity of the undesired water flow behind the casing and $K$ is as previously defined.

The count rate $C_{A,1}$ may therefore be written as $$C_{A,1} = C^T_{A,2} e^{K/v_T} + C^F_{A,2} e^{K/v_F} \tag{13}$$

but the count rate $C_{A,2}$ may also be written as $$C_{A,2} = C^T_{A,2} + C^F_{A,2} \tag{14}$$

By solving equation 14 for $C^T_{A,2}$ and substituting this into (13) the count rate $C_{A,1}$ may be written as $$C_{A,1} = C_{A,2} e^{K/v_T} - C^F_{A,2} e^{K/v_T} + C^F_{A,2} e^{K/v_F} \tag{15}$$

Similarly, an equation may be developed for the count rate in energy window $C_{B,1}$ which may be written as $$C_{B,1} = C_{B,2} e^{K/v_T} - C^F_{B,2} e^{K/v_T} + C^F_{B,2} e^{K/v_T} \tag{16}$$

but here also the count rate $C^F_{B,2}$ may be written as $$C^F_{B,2} = C^F_{B,1} e^{-K/v_F} \tag{17}$$

Now, substituting equation 17 into equation 16 yields equation 18 as follows for the total count rate $C_{B,1}$ $$C_{B,1} = C_{B,2} e^{K/v_T} - C^F_{B,1} (e^{K/v_F} + 1) \tag{18}$$

but also the count rate $C^F_{A,2}$ is given by equation 19

$$C^F_{A,2} = C^F_{B,1} L(R_f) e^{-K/v_F} \tag{19}$$

wherein in the expression of equation 19, $L(R_f)$ is a function of $R_f$ the distance between the center of the sonde and the center of flow behind the casing. It will be recalled that this function is illustrated for a particular experimental geometry by the graphical representation of FIG. 6 which was previously discussed. An approximate analytical expression for the function $L(R)$ for a particular sonde geometry may then be developed and is given by the expression of equation 20.

$$L(R) = 6.5 - 0.8 R \tag{20}$$

Substituting equation 19 into equation 15 yields equation 21.

$$C_{A,1} = C_{A,2} e^{K/v_T} - C^F_{B,1} L(R_f) (e^{K/v_T} e^{-K/v_F} + 1) \tag{21}$$

Substituting equation 18 into equation 21 yields expression of equation 22.

$$C_{A,1} = e^{K/v_T} (C_{A,2} - L(R_f) C_{B,2}) + L(R_f) C_{B,1}$$

or $$v_T = K / \ln \frac{C_{A,1} - L(R_f) C_{B,1}}{C_{A,2} - L(R_f) C_{B,2}} \tag{22}$$

Equation 22 may be solved for the unknown function $L(R_f)$ which is seen to be given by equation 22-a.

$$L(R_f) = \frac{(C_{A,1} - C_{A,2} e^{K/v_T})}{(C_{B,1} - C_{B,2} e^{K/v_T})} \tag{22-a}$$

Similarly, an expression for $v$, the linear flow rate of the water behind the casing may be developed as equation 23.

$$v_F = K / \ln \frac{C_{A,1} - L(R_T) C_{B,1}}{C_{A,2} - L(R_T) C_{B,2}} \tag{23}$$

Referring to FIG. 13A, the distance $R_T$ which is measured from the center of the sonde 303 to the center of the production tubing 307 is generally known or can be estimated to an acceptable degree of accuracy. Equation 20 can therefore be used to compute the function $L(R_T)$ from $R_T$. The remaining terms on the right hand side of the equation 23 are known ($K$) or are measured quantities ($C_{A,1}$, $C_{A,2}$, $C_{B,1}$, and $C_{B,2}$). Equation 23 can, therefore, be solved for $V_F$, the linear flow rate of the water behind the casing. Equation 15 may be rewritten as equation 23, then as follows:

$$C^F_{A,2} = \frac{C_{A,1} - C_{A,2} e^{K/v_T}}{(e^{-K/v_F} - e^{-K/v_T})} \tag{24}$$

The term $v_T$, which is the linear flow velocity within the production tubing 307, can be computed from the rate of water produced (which is usually known) and the cross sectional area of the production tubing 307. The remaining terms on the right hand side of equation (24) are either known ($K$), can be computed ($v_F$), or are measured ($C_{A,1}$ and $C_{A,2}$). Equation 23 can, therefore, be solved for $C^F_{A,2}$.

Using $v_T$ which can be computed as described above and the measured quantities $C_{A,1}$, $C_{A,2}$, $C_{B,1}$, and $C_{B,2}$, equation 22A can be solved for $L(R_F)$. This value of $L(R_F)$ can then be substituted into equation 20 to obtain $R_F$, the radical distance between the center of the sonde 303 and the center of the flow behind the casing.

Finally, using $v_F$ obtained from equation 23, $R_F$ obtained from equations 22A and (20) and $C^F_{A,2}$ obtained from equation 24, equation 7 can be used to compute $V_F$ the volume flow rate of the water behind the casing where
$C_i = C^F_{A,2}$
$R = R_F$
$V = V_F$ and $Q$ is an empirically determined calibration constant.

The foregoing technique is, of course, equally applicable both above and below the perforations in the upper producing zone of the multiple well completion so that fluid flow in both an upward and downward direction on opposite sides of the perforations may be detected in this manner. This technique which has just been described may be thought of as discriminating against the detection of the known fluid flow within the producing zone through the production tubing passing from the lower zone on the basis of its distance from the detectors being different from that of any possible undesired fluid flow exterior to the casing.

Of course, it will be appreciated by those skilled in the art that if the two producing zones illustrated in FIG. 13 are in reality several hundred feet apart such that the undesired fluid flow in one zone could not conceivably be affected by shutting in the production in the deeper zone, then the more desirable technique would be to simply shut in the flow of production from the lower zone to eliminate the interference due to the flow of this fluid through its production tubing string which passes through the shallower producing zone. However, if as previously stated, the two zones are not close enough together so that this shut in procedure would not be desirable in order to preserve the operating parameters of each producing zone as near as possible, then the just described technique may be utilized to discriminate the flow of fluid exterior to the casing from that in the production tubing string passing within the casing.

It will further be appreciated by those skilled in the art that the same theory would apply whether there are two or even more producing zones completed at lower depths than the production zone being investigated. In this case, the above described procedure and theory could be extended in a similar manner as described above to individually take into account each flow contributions from all such production tubing strings which pass through the zone being investigated.

In making the measurement then, the procedure would be to lower the small diameter (1-11/16 inch) sonde through the producing tubing string into the producing zone to be investigated. Stationary oxygen activation count rate measurements would then be taken in the two energy windows A and B both above and below the perforations in the producing zone with the detectors first below and then above the neutron source in the same manner previously described. The foregoing interpretation of these count rates would then be applied. The volume flow rate $V$ and linear flow rate $v$ of any undesired fluid flow behind the casing would thus be detectable.

PRODUCTION PROFILING IN CASED WELLBORES

While the foregoing discussions have concerned the detection of undesired fluid flow behind the casing, it is readily apparent to those skilled in the art that the instrumentation involved may be used to perform production profiling from spaced perforations within the casing. In such an instance, the downhole sonde would be set up within the neutron source located below the dual spaced detectors and stationary measurements taken at intervals between each set of perforations in a producing zone which is perforated, for example, over a long interval. As the sonde is moved downwardly past each set of perforations, the linear flow velocity and volume flow rate of the fluid within the casing may be determined very accurately since the casing cross-section F is accurately known in detail. As the oxygen activation technique of the measurement would not detect moving hydrocarbon as it flows past the instrument but would detect any undesired water cut entering from a particular set of perforations, then as the sonde is lowered past a set of perforations which is producing the undesired water cut, the volume flow rate and linear flow velocity of water entering from a particular set of perforations would be detectable by the foregoing techniques.

In this manner, the detection of undesired water stringers in a producing formation which is perforated over a long interval of production may be located. The technique for determining the linear flow rate $v$, and volume flow rate $V$, of the desired water cut past the detectors would be the same as previously described.

It is conceivable that an undesired water cut may be produced which would flow downwardly within the casing with equal facility to that which would flow upwardly within the casing. In this case, the logging instrument may be raised to the surface, the source-detector reversed, and the sequence of stationary measurements at locations between the perforations repeated while moving the sonde downwardly past each set of perforations. In this manner, undesired water cut which is produced from a given level of perforations may be detected within the casing whether it flows in a downward direction from the perforations or in an upward direction from the perforations within the casing.

The foregoing descriptions may make other alternative embodiments of the methods and apparatus of the present invention apparent to those of skill in the art. It is therefore the aim of the appended claims to cover all such changes and modifications as fall within the true spirit and scope of the invention.

We claim:

1. A method for locating and determining the linear flow rate and direction of undesired water migration behind casing in a cased well borehole producing well fluid through casing perforations, comprising the steps of:
   a. locating a well tool having a source of high energy neutrons at least some of which having sufficient energy to cause the nuclear reaction $O^{16}(n,p)N^{16}$ and at least two gamma ray detectors longitudinally spaced from said source and each other to a position adjacent above or below the perforations;
   b. irradiating the borehole environs with high energy neutrons from said source;

c. detecting at each of said detectors gamma rays primarily caused by the decay of the unstable isotope nitrogen 16 and generating signals representative thereof;

d. combining said signals according to a predetermined relationship to derive an indication of the direction and linear flow rate of any elemental oxygen nuclei comprising undesired fluid flow in a preferred direction behind the well casing at said adjacent position; and e. estimating the radial distance from the detector locations of such undesired fluid flow and combining said distance and said linear flow rate indication according to a second predetermined relationship to provide an indication of the volume flow rate of such undesired flow.

2. The method of claim 1 and further including the steps of:

removing said well tool from the borehole after making the first measurement sequence adjacent above or below the perforations;

reversing the juxtaposition of said source and said detectors;

locating said tool in the opposite sense below or above the perforations; and repeating steps (b), (c) and (d) with said tool in the new location.

3. The method of claim 2 wherein the detecting step is performed by detecting gamma rays only in a preselected energy range in the gamma ray energy spectrum corresponding to the decay of $N^{16}$.

4. The method of claim 3 wherein said preselected energy range extends from approximately 4.45 MEV to approximately 7.20 MEV.

5. The method of claim 1 wherein the detecting step is performed by detecting gamma rays only in a preselected energy range in the gamma ray energy spectrum corresponding to the decay of $N^{16}$.

6. The method of claim 5 wherein said preselected energy range extends from approximately 4.45 MEV to approximately 7.20 MEV.

7. The method of claim 1 wherein the estimate of the radial distance from the detector locations to the undesired fluid flow is assumed to be slightly greater than the outside radius of the casing.

8. The method of claim 7 wherein the estimate is taken to be from 0.5 to 1.5 inches greater than the outside radius of the casing.

9. A method for locating and determining the linear flow rate and direction of undesired water migration behind casing in a cased well borehole producing well fluid through casing perforations, comprising the steps of:

a. moving a well tool having a source of high energy neutrons at least some of which having sufficient energy to cause the nuclear reaction $O^{16}$ $(n,p)N^{16}$ and at least two gamma ray detectors longitudinally spaced from said source and each other past the perforations from above or below at a known rate;

b. irradiating the borehole environs with high energy neutrons from said source;

c. detecting at each of said detectors gammma rays primarily caused by the decay of the unstable isotope nitrogen 16 and generating signals representative thereof;

d. combining said signals according to a predetermined relationship to derive an indication of the direction and linear flow rate of any elemental oxygen nuclei comprising undesired fluid flow in a preferred direction behind the well casing in the interval over which the tool is moved; and e. estimating the radial distance from the detector locations of such undesired fluid flow and combining said distance and said linear flow rate indication according to a second predetermined relationship to provide an indication of the volume flow rate of such undesired flow.

10. The method of claim 9 and further including the steps of:

removing said well tool from the borehole after making the first measurement sequence with the well tool moving a first direction past the perforations;

reversing the juxtaposition of said source and said detectors;

moving the well tool past the perforations at a known rate in the opposite direction from the first measurement sequence past the perforations; and repeating steps (b), (c) and (d) with said tool moving in the opposite direction.

11. The method of claim 10 wherein the detecting step is performed by detecting gamma rays only a preselected energy range in the gamma ray energy spectrum corresponding to the decay of $N^{16}$.

12. The method of claim 11 wherein said preselected energy range extends from approximately 4.45 MEV to approximately 7.20 MEV.

13. The method of claim 9 wherein the detecting step is performed by detecting gamma rays only in a preselected energy range in the gamma ray energy spectrum corresponding to the decay of $N^{16}$.

14. The method of claim 13 wherein said preselected energy range extends from approximately 4.45 MEV to approximately 7.20 MEV.

15. The method of claim 9 wherein the estimate of the radial distance from the detector locations to the undesired fluid flow is assumed to be slightly greater than the outside radius of the casing.

16. The method of claim 15 wherein the estimate is taken to be from 0.5 to 1.5 inches greater than the outside radius of the casing.

* * * * *